United States Patent
Chen et al.

(10) Patent No.: US 7,725,453 B1
(45) Date of Patent: May 25, 2010

(54) CUSTOM SEARCH INDEX

(75) Inventors: Johnny Chen, Mountain View, CA (US);
Naval Verma, Sunnyvale, CA (US);
Clarence Christopher Mysen, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 91 days.

(21) Appl. No.: 11/618,327

(22) Filed: Dec. 29, 2006

(51) Int. Cl.
*G06F 19/00* (2006.01)

(52) U.S. Cl. .................................. 707/711

(58) Field of Classification Search ............ None
See application file for complete search history.

(56) References Cited

U.S. PATENT DOCUMENTS

| | | | |
|---|---|---|---|
| 6,081,829 A * | 6/2000 | Sidana ............... | 709/203 |
| 2002/0120564 A1 | 8/2002 | Strietzel | |
| 2004/0015485 A1 * | 1/2004 | Salerno et al. ........... | 707/3 |
| 2004/0143580 A1 * | 7/2004 | Chi et al. ............... | 707/100 |
| 2004/0220926 A1 * | 11/2004 | Lamkin et al. .......... | 707/3 |
| 2005/0132067 A1 | 6/2005 | Bennett et al. | |
| 2005/0246651 A1 * | 11/2005 | Krzanowski ........... | 715/770 |
| 2005/0256866 A1 * | 11/2005 | Lu et al. ............... | 707/5 |
| 2006/0271524 A1 * | 11/2006 | Tanne et al. ............ | 707/3 |
| 2007/0124283 A1 * | 5/2007 | Gotts et al. ............. | 707/3 |
| 2007/0168331 A1 * | 7/2007 | Reddy et al. ............ | 707/3 |
| 2007/0203891 A1 * | 8/2007 | Solaro et al. ........... | 707/3 |
| 2007/0204232 A1 * | 8/2007 | Ray et al. ............... | 715/738 |
| 2007/0288473 A1 * | 12/2007 | Mukherjee et al. ...... | 707/10 |
| 2008/0077579 A1 * | 3/2008 | Ozveren et al. ......... | 707/5 |
| 2008/0168048 A1 * | 7/2008 | Bell et al. .............. | 707/5 |

OTHER PUBLICATIONS

"Yahoo Search Subscriptions Brings Premium Content Into Web Search" Blog, http://blog.searchenginewatch.com/blog/050616-000001, pp. 1-3, posted Jun. 15, 2005.

U.S. Appl. No. 12/209,996, filed on Sep. 12, 2008 entitled "Custom Search Index Data Security", by Johnny Chen et al.; 51 pages + 23 pages of drawings.

U.S. Appl. No. 11/618,321, filed on Dec. 29, 2006 entitled Ranking Custom Search Results, by Clarence C. Mysen et al.; 37 pages + 17 pages of drawings.

U.S. Appl. No. 11/618,461, filed on Dec. 29, 2006 entitled "Custom Search", by Clarence C. Mysen et al.; 41 pages + 22 pages of drawings.

U.S. Appl. No. 11/618,463, filed on Dec. 29, 2006 entitled "Custom Content Provisioning", by Clarence C. Mysen et al.; 47 pages + 17 pages of drawings.

U.S. Appl. No. 11/618,391, filed on Dec. 29, 2006 entitled "Custom Content and Advertising", by Clarence C. Mysen et al.; 28 pages + 10 pages of drawings.

* cited by examiner

*Primary Examiner*—Charles Rones
*Assistant Examiner*—Kurt Mueller
(74) *Attorney, Agent, or Firm*—Harrity & Harrity, LLP

(57) ABSTRACT

A system includes an application programming interface, an indexer, a security unit and at least one search engine. The application programming interface uploads user-selected custom content from a first user. The indexer indexes the custom content to produce a first search index. The security unit authenticates a user and the at least one search engine receives a search query from the user, searches the first search index based on the search query, and searches a second search index based on the search query and based on results of the user authentication, where the second search index is different than the first search index.

9 Claims, 13 Drawing Sheets

CUSTOM SEARCH INDEX

BACKGROUND

The World Wide Web ("web") contains a vast amount of information. Locating a desired portion of the information, however, can be challenging. This problem is compounded because the amount of information on the web and the number of new users inexperienced at web searching are growing rapidly. Search engines assist users in locating desired portions of this information by cataloging web pages. Typically, in response to a user's request, the search engine returns references to documents relevant to the request.

A web crawler is typically used to find and retrieve documents (e.g., web pages) on the web. To retrieve a document from the web, the web crawler sends a request to, for example, a web server for a document, downloads the entire document, and then provides the document to an indexer. The indexer typically takes the text of the crawled document, extracts individual terms from the text and sorts those terms (e.g., alphabetically) into a search index. The web crawler and indexer repeat this process as the web crawler crawls documents across the web. Each entry in the search index contains a term stored in association with a list of documents in which the term appears and the location within the document where the term appears. The search index, thus, permits rapid access to documents that contain terms that match search terms of a user supplied search query. To improve search performance, the indexer typically ignores common words, called stop words (e.g., the, is, on, or, of, how, why, etc.) when creating or updating the search index. Existing indexers create a single search index that contains terms extracted from all documents crawled on the web.

Generally, search engines may base their determination of the user's interest on search terms (called a search query) entered by the user. The goal of the search engine is to identify links to high quality, relevant results (e.g., web pages) based on the search query using the search index. Typically, the search engine accomplishes this by matching the terms in the search query to terms contained in the search index, and retrieving a list of documents associated with each matching term in the search index. Documents that contain the user's search terms are considered "hits" and are returned to the user. The "hits" returned by the search engine may be ranked among one another by the search engine based on some measure of the quality and/or relevancy of the hits. A basic technique for sorting the search hits relies on the degree with which the search query matches the hits. For example, documents that contain every term of the search query or that contain multiple occurrences of the terms in the search query may be deemed more relevant than documents that contain less than every term of the search query or a single occurrence of a term in the search query and, therefore, may be more highly ranked by the search engine.

SUMMARY

According to one aspect, a method may include crawling the web to obtain web content and indexing the web content to produce a web search index. The method may further include receiving first custom content associated with a first user, where the first custom content includes data that is uploaded by the first user via an application programming interface or includes data that is designated by the first user from a set of documents. The method may also include indexing the first custom content to produce a first custom search index, wherein the first custom search index is different than the web search index. The method may further include permitting unrestricted access to the web search index and permitting restricted access to the first custom search index.

According to another aspect, a method may include indexing first content uploaded from a first user to produce a first index and indexing second content uploaded from a second user to produce a second index. The method may further include permitting restricted access to the first index by other users and permitting unrestricted access to the second index by the other users.

According to a further aspect, a method may include receiving user-selected custom content from a first user and indexing the custom content to produce a first search index. The method may further include receiving a search query from a second user and authenticating the second user. The method may further include searching a second search index based on the search query and searching the first search index based on the search query and based on results of the user authentication, wherein the first search index is different than the second search index. The method may also include presenting search results to the second user that include information resulting from searching the first and second search indexes.

According to an additional aspect, a method may include maintaining a first search index and a second search index, where the first search index is different than the second search index. The method may further include permitting an unauthenticated first user to search the first search index but not the second search index and permitting an authenticated second user to search the first search index and the second search index.

According to yet another aspect, a method may include uploading first content from a user, wherein the first content comprises content selected by the user and indexing, by a content indexer associated with a search engine, the first content to create a first search index. The method may further include authenticating users requesting access to the first content to produce authenticated users and unauthenticated users. The method may also include permitting the authenticated users to search the first content using the first search index and denying the unauthenticated users access to the first content.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
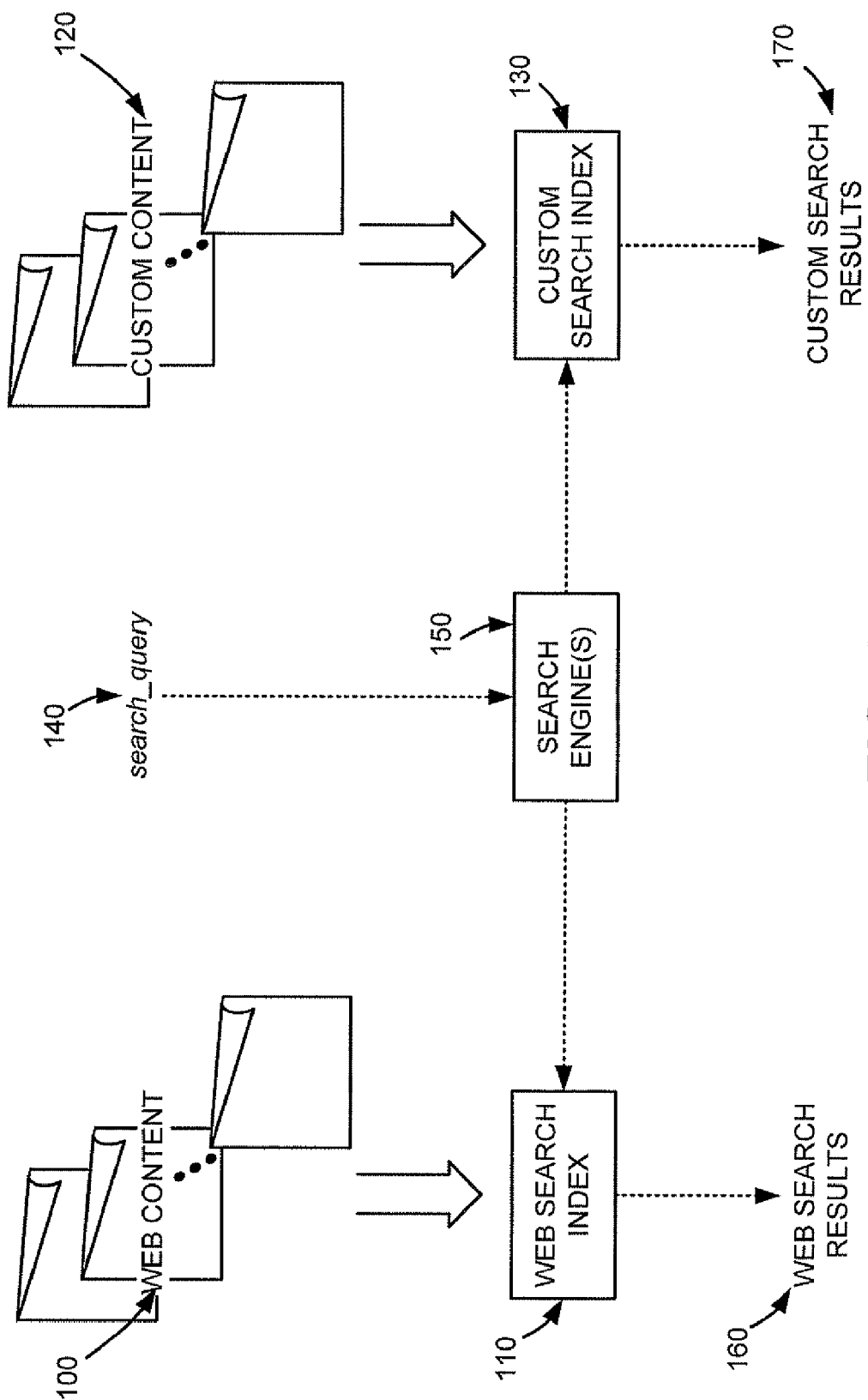
FIG. 1 is a diagram of an overview of an exemplary implementation described herein.

The following detailed description of the invention refers to the accompanying drawings. The same reference numbers in different drawings may identify the same or similar elements. Also, the following detailed description does not limit the invention.

Implementations described herein may permit a user to create their own corpora of customized content that may be accessed and searched by other users via a content searching service, such as, for example, Google Search. A content searching system may crawl the web to retrieve web content and then index the retrieved web content to create a web search index. A user may also upload or otherwise identify custom content to the content searching system, which may then index the custom content to create a custom search index that is different than the web search index. Other users may also upload their own custom content to the content searching system, which may then be indexed to create different respective custom search indexes that are separate and distinct from the web search index and other custom search indexes. Searching of custom content using the different custom search indexes may then be selectively permitted by users who may or may not have to be authenticated for the custom content that they wish to access (e.g., search). For example, the custom search index may store information different from the information stored by the web search index. In one implementation, the custom search index may store a subset of the information stored in the web search index. In this case, it may be possible for the custom search index to store pointers to information in the web search index. Alternatively, or additionally, the custom search index may store information that is not present in the web search index. Also, the custom search index may be considered different from the web search index in the sense that the custom search index may be searchable separate from the web search index.

A "document," as the term is used herein, is to be broadly interpreted to include any machine-readable and machine-storable work product. A document may include, for example, an e-mail, an image, video, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). "Content," as the term is used herein, is to be broadly interpreted to include data that may or may not be in document form. Examples of content may include data associated with a document or data in a database. "Custom content," as the term is used herein, is to be broadly interpreted to include content that has been uploaded by a user for indexing and/or content identified by a user for indexing. A "user," as that term is used here, is to be broadly interpretred to include one or more people (e.g., a person, a group of people that may have some relationship (e.g., people associated with a business or organization), or a group of people with no formal relationship). A "link," as the term is used herein, is to be broadly interpreted to include any reference to/from a document from/to another document or another part of the same document. A "site" as the term is used herein is to be broadly interpreted to include a group of documents hosted by any type of entity. A "site" may include a group of documents under common control, such as a group of documents associated with an organization, a domain name, a host name, or a set of documents created by the same person or group of persons. A "site" may also include a group of documents about a particular topic, a group of documents in a particular language, a group of documents hosted in a particular country, or a group of documents written in a particular writing style.

Overview

FIG. 1 is a diagram of an overview of an exemplary implementation described herein. As shown in FIG. 1, web content 100 may be retrieved using, for example, a web crawler (not shown). The web crawler may find and retrieve documents (e.g., web pages) stored on the web and extract content from the documents. For example, the web crawler may send a request to a web server for a document, download the entire document, and then provide the document to an indexer (not shown). The indexer may then index the retrieved web content to create a web search index 110. The indexer extracts individual terms or other data from the crawled document and sorts those terms or other data (e.g., alphabetically) into web search index 110. Other techniques for extracting and indexing content, that are more complex than simple word-level indexing, may also be used, including techniques for indexing extensible markup language (XML) data, images, videos, etc. Each entry in web search index 110 may contain a term or other data stored in association with a list of documents in which the term or other data appears and the location within the document where the term or other data appears. Web search index 110 may subsequently be used to search for specific documents whose content matches a search query 140.

As further shown in FIG. 1, custom content 120 may also be obtained. Custom content 120 may include content uploaded by a user, content designated by the user as being part of its custom content (e.g., user designates one or more websites or web pages to be included in the user's custom content), web content that is available only to selected subscribers via subscription, or other types of content that may be aggregated and indexed separately from web search index 110 (e.g., the user may designate websites or web pages that contain content about a selected topic as being included in the user's custom content). An indexer (not shown) may index the obtained custom content to create a custom search index 130 that may be different from web search index 110 (e.g., custom search index 130 may include information different from web search index 110 and/or custom search index 130 may be searchable separate from web search index 110). The indexer may take the text or other data from custom content 120, extract individual terms or other data from custom content 120 and sort those terms or other data (e.g., alphabetically) into custom search index 130. Other techniques for extracting and indexing content, that are more complex than simple word-level indexing, may also be used, including techniques for indexing XML data, images, videos, etc. Each entry in custom search index 130 may contain a term or other data stored in association with a location within custom content 120 where the term or other data appears. Custom search index 130 may subsequently be used to search for specific content of custom content 120 that matches a search query 140. Custom search index 130 may include multiple custom search indexes (not shown), each being associated with a different corpus of custom content.

Search engine(s) 150 may receive search query 140 and may selectively search either of web search index 110 or custom search index 130 (or multiple different custom search indexes), or may search both of web search index 110 and custom search index 130 (or other different custom search indexes), using search query 140. A search of web search index 110 by search engine(s) 150 may return web search results 160 that match search query 140. A search of custom search index 130 by search engine(s) 150 may return custom search results 170 that match search query 140. Web search results 160 and custom search results 170 may be represented together or separately with a search result document, as will be described below.

Exemplary Network Configuration

Figure 2:
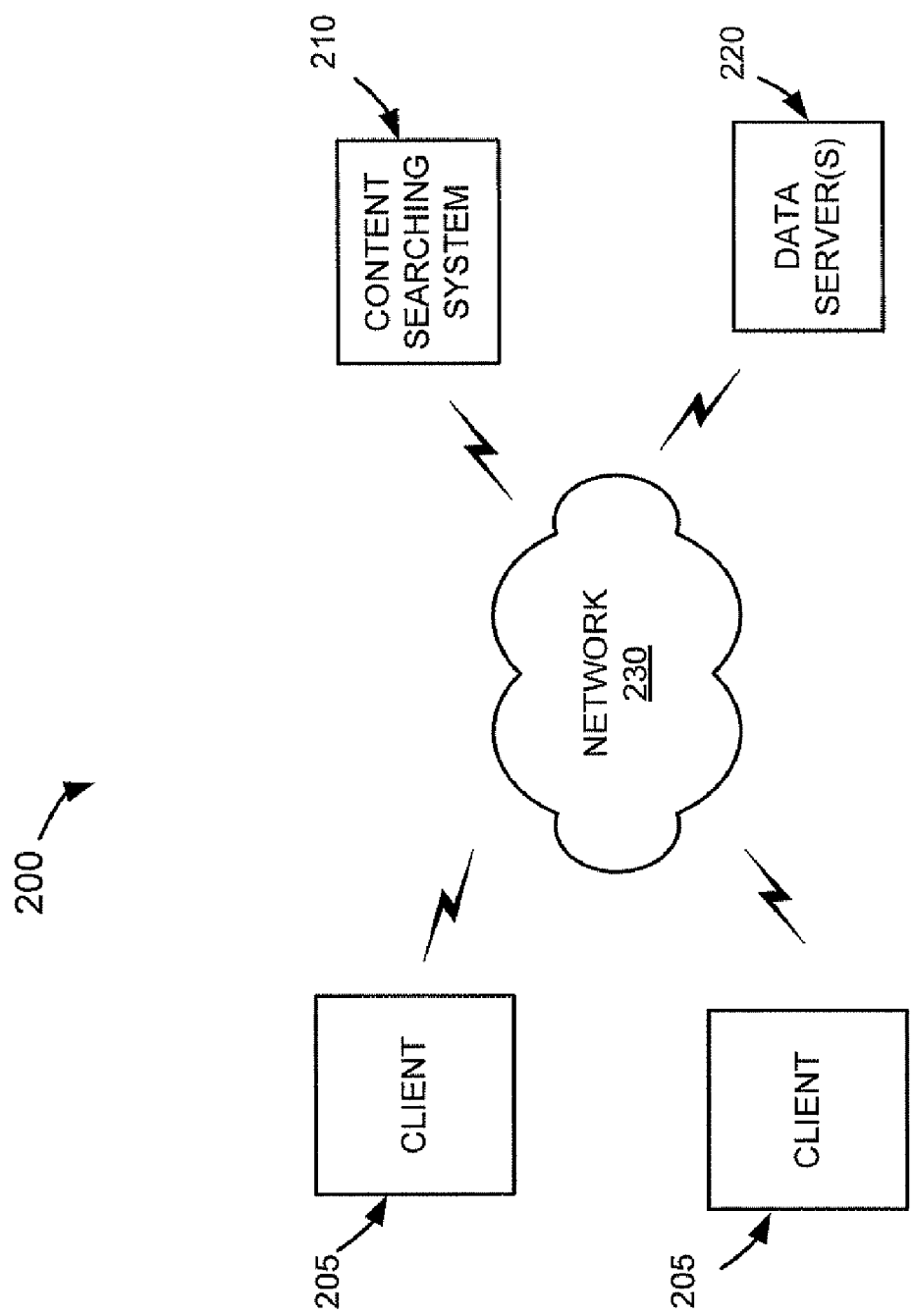
FIG. 2 is an exemplary diagram of a network in which systems and methods described herein may be implemented.

FIG. 2 is an exemplary diagram of a network 200 in which systems and methods described herein may be implemented. Network 200 may include multiple clients 205 connected to a content searching system 210 and data server(s) 220 via a network 230. Two clients 205, a single content searching system 210 and one or more data servers 220 have been illustrated as connected to network 230 for simplicity. In practice, there may be more or fewer clients, content searching systems, and data servers. Also, in some instances, a client 205 may perform one or more functions of content searching system 210 or server(s) 220 or content searching system 210 or a server 220 may perform one or more functions of a client 205.

Clients 205 may include client entities. A client entity may be defined as a device, such as a personal computer, a wireless telephone, a personal digital assistant (PDA), a lap top, or another type of computation or communication device, a thread or process running on one of these devices, and/or an object executable by one of these devices. Clients 205 may implement a browser for browsing documents stored at data server(s) 220. Clients 205 may also use the browser for accessing content searching system 210 to search documents (e.g., web content) associated with data server(s) 220 and/or custom content, as described further below.

Data server(s) 220 may store or maintain documents that may be browsed by clients 205, or may be crawled by content searching system 210. Such documents may include data related to published news stories, products, images, user groups, geographic areas, or any other type of data. For example, data server(s) 220 may store or maintain news stories from any type of news source, such as, for example, the Washington Post, the New York Times, Time magazine, or Newsweek. As another example, server(s) 230 may store or maintain data related to specific products, such as product data provided by one or more product manufacturers. As yet another example, server(s) 230 may store or maintain data related to other types of web documents, such as pages of web sites (e.g., web content).

Content searching system 210 may include one or more hardware and/or software components that access, fetch, index, search, and/or maintain general web documents and/or custom content documents. Content searching system 210 may implement a data aggregation service by crawling a corpus of documents (e.g., web pages) hosted on data server(s) 220, indexing the documents, and storing information associated with these documents in a repository of crawled documents. The aggregation service may be implemented in other ways, such as by agreement with the operator(s) of data server(s) 220 to distribute their documents via the data aggregation service.

While content searching system 210 and server(s) 220 are shown as separate entities, it may be possible for content searching system 210 to perform one or more of the functions of one or more of servers 220, and vice versa. For example, it may be possible for content searching system 210 and one or more servers 220 to be implemented as a single entity. It may also be possible for a single one of content searching system 210 or one or more servers 220 to be implemented as two or more separate (and possibly distributed) devices.

Network 230 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet or a combination of networks. The PLMN(s) may further include a packet-switched sub-network, such as, for example, General Packet Radio Service (GPRS), Cellular Digital Packet Data (CDPD), or Mobile IP sub-network. Clients 205, content searching system 210 and server(s) 220 may connect to network 230 via wired and/or wireless connections.

Exemplary Content Searching System

Figure 3:
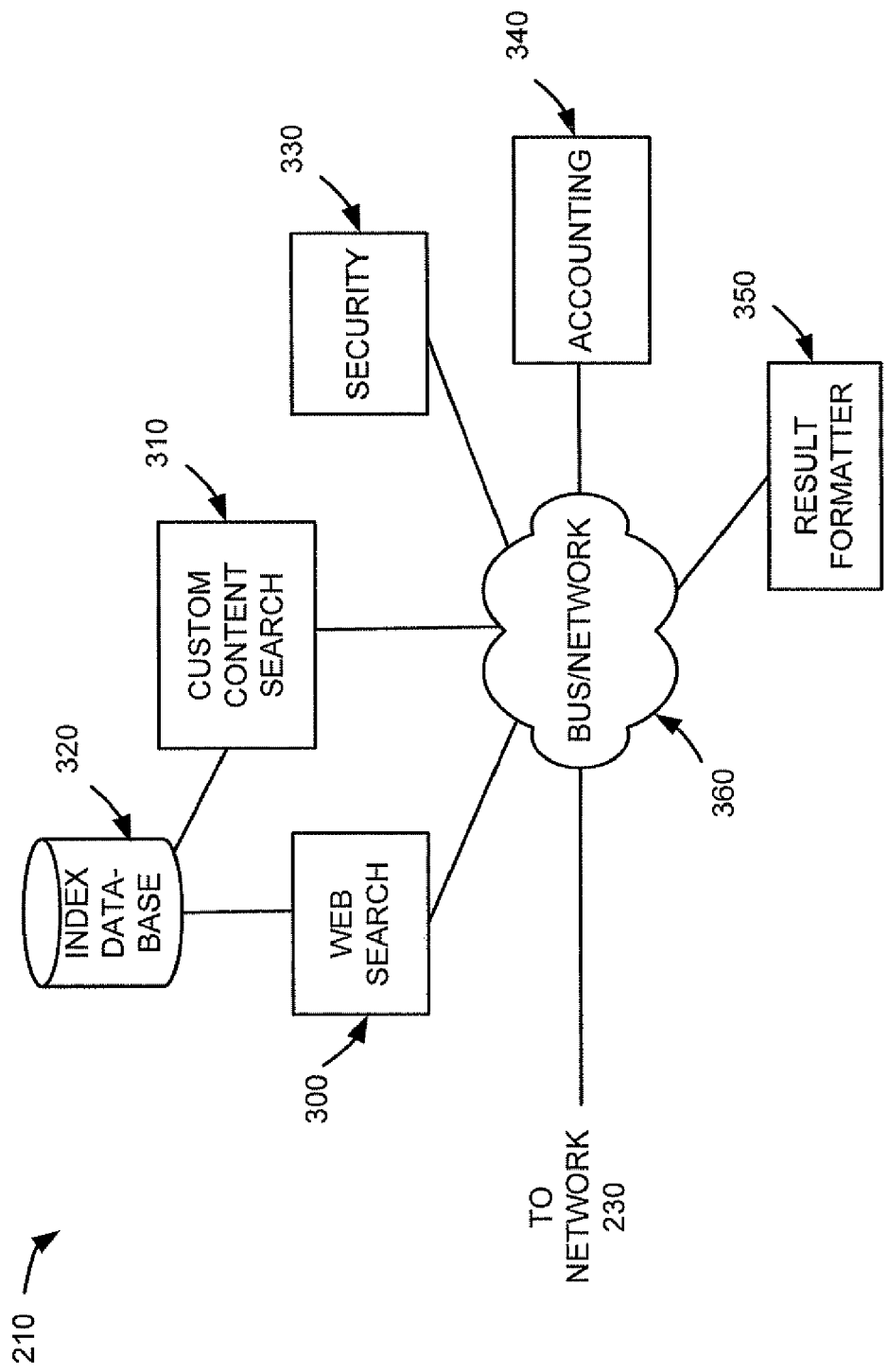
FIG. 3 is an exemplary diagram of the content searching system of FIG. 2.

FIG. 3 is an exemplary diagram of content searching system 210. As shown in FIG. 3, content searching system 210 may include a web search unit 300, a custom content search unit 310, an index database 320, a security unit 330, an accounting unit 340 and a result formatter 360 interconnected via a bus and/or network 360 with network 230. Web search unit 300, custom content search unit 310, security unit 330, accounting unit 340 and result formatter 350 may be implemented as one or more separate server entities, as software and/or hardware components within a single server entity, or as software and/or hardware components distributed across multiple server entities.

Web search unit 300 may crawl documents (e.g., containing web content) stored at data server(s) 220, index the crawled documents to create a web search index and search the crawled documents using the web search index. Custom content search unit 310 may obtain custom content, such as, for example, content uploaded from users, content designated by the user as being part of its custom content (e.g., the user designates one or more web sites or web pages to be included in the user's custom content), content obtained from sources that require subscriptions for access to the content, and/or content on a given topic that may be obtained and aggregated from multiple sources, index the content in separate custom search indexes to create multiple different custom search indexes 130 and search the custom content using one or more of the different custom search indexes 130.

Index database 320 may store a web search index 110 and one or more custom search indexes 130. Index database 320 may store web search index 110 and the one or more custom search indexes 130 as different data structures that may be searched independently of one another. Alternatively, index database 320 may store one or more custom search indexes 130 within the same data structure as web search index 110 in a manner that they may be searched independently of one another.

Security unit 330 may authenticate users desiring to upload custom content to custom content search unit 310 and/or may authenticate users desiring to search one or more custom content indexes 130 associated with custom content. Security unit 330 may authenticate users by passing authentication tokens to the users which define the custom search indexes that are accessible by a particular user, and may contain security keys to permit encryption for sensitive information. Security unit 330 may authenticate users and authorize custom content search unit 310 to permit access to selected custom search indexes to the authenticated users.

Accounting unit 340 may establish and modify user access rights, may record and report user access to selected custom search indexes, may obtain feedback from users accessing given custom search indexes and/or may track and control access to given custom search indexes based on whether users have subscribed to the custom search indexes.

Result formatter 350 may return search results obtained from web search unit 300 and/or custom content search unit 310 in a formatted and organized manner. Result formatter 350 may combine custom content search results together with web content search results in a way that is meaningful to the user (e.g., in a hypertext markup language (HTML) page). Bus and/or network 360 may include a communication path, such as, for example, a system bus or a network that permits web search unit 300, custom content search unit 310, security unit 330, accounting unit 340 and result formatter 350 to communicate with one another and with entities on network 230.

Although FIG. 3 shows exemplary components of content searching system 210, in other implementations, content searching system 210 may include fewer, different, or additional components than depicted in FIG. 3. In still other implementations, one or more components of content searching system 210 may perform the tasks performed by one or more other components of content searching system 210.

Exemplary Web Search Unit

Figure 4:
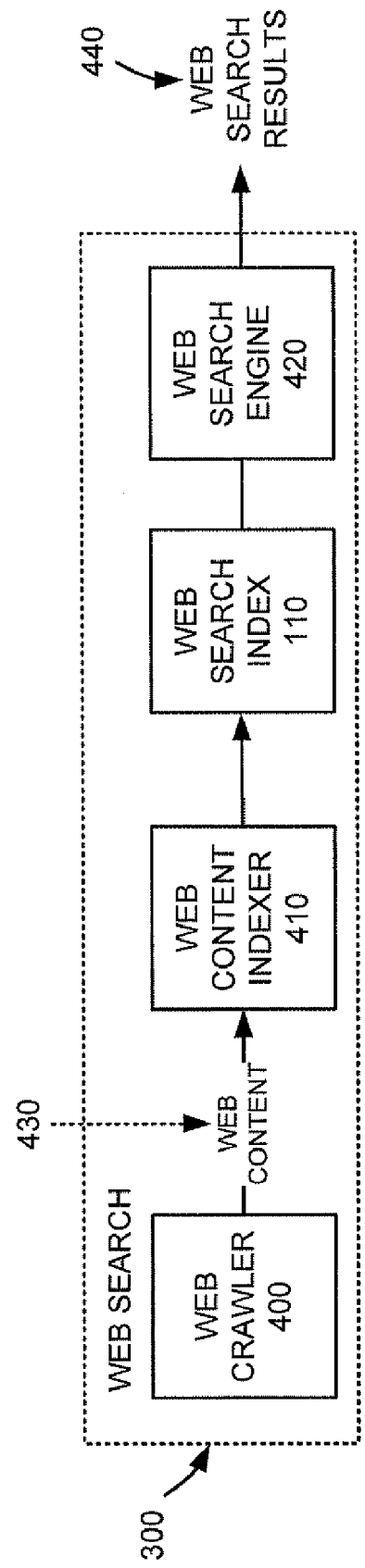
FIG. 4 is an exemplary diagram of the web search unit of FIG. 3.

FIG. 4 is an exemplary diagram of web search unit 300. As shown in FIG. 4, web search unit 300 may include a web crawler 400, a web content indexer 410, a web search index 110 and a web search engine 420.

Web crawler 400 may find and retrieve web content 430 (e.g., web documents) and provide the retrieved web content 430 to web content indexer 410. For example, web crawler 400 may send a request to a web server for a web document, download the entire web document, and then provide the web document to web content indexer 410. Web content indexer 410 may index web content 430 to create web search index 110. For example, web content indexer 410 may take the text or other data of a given crawled document, extract individual terms or other data from the text of the document and sort those terms or other data (e.g., alphabetically) into web search index 110. Other techniques for extracting and indexing content, that are more complex than simple word-level indexing, may also be used, including techniques for indexing XML data, images, videos, etc. Each entry in web search index 110 may contain a term or other data stored in association with a list of documents in which the term or other data appears and the location within the document where the term or other data appears. Web search engine 420 may search web search index 110, based on a received search query, to match terms of the search query with terms or other data (e.g., video, images, etc.) contained in entries in web search index 110. Web search engine 420 may retrieve a corresponding list of documents from each entry in web search index 110 that matches a term of the search query. The lists of documents retrieved from one or more entries in web search index 110 may be returned as web search results 440. In one implementation, each result of web search results 440 may include a uniform resource locator (URL) associated with a corresponding search result document and, possibly, a snippet of content extracted from the corresponding search result document.

Exemplary Custom Search Unit

Figure 5:
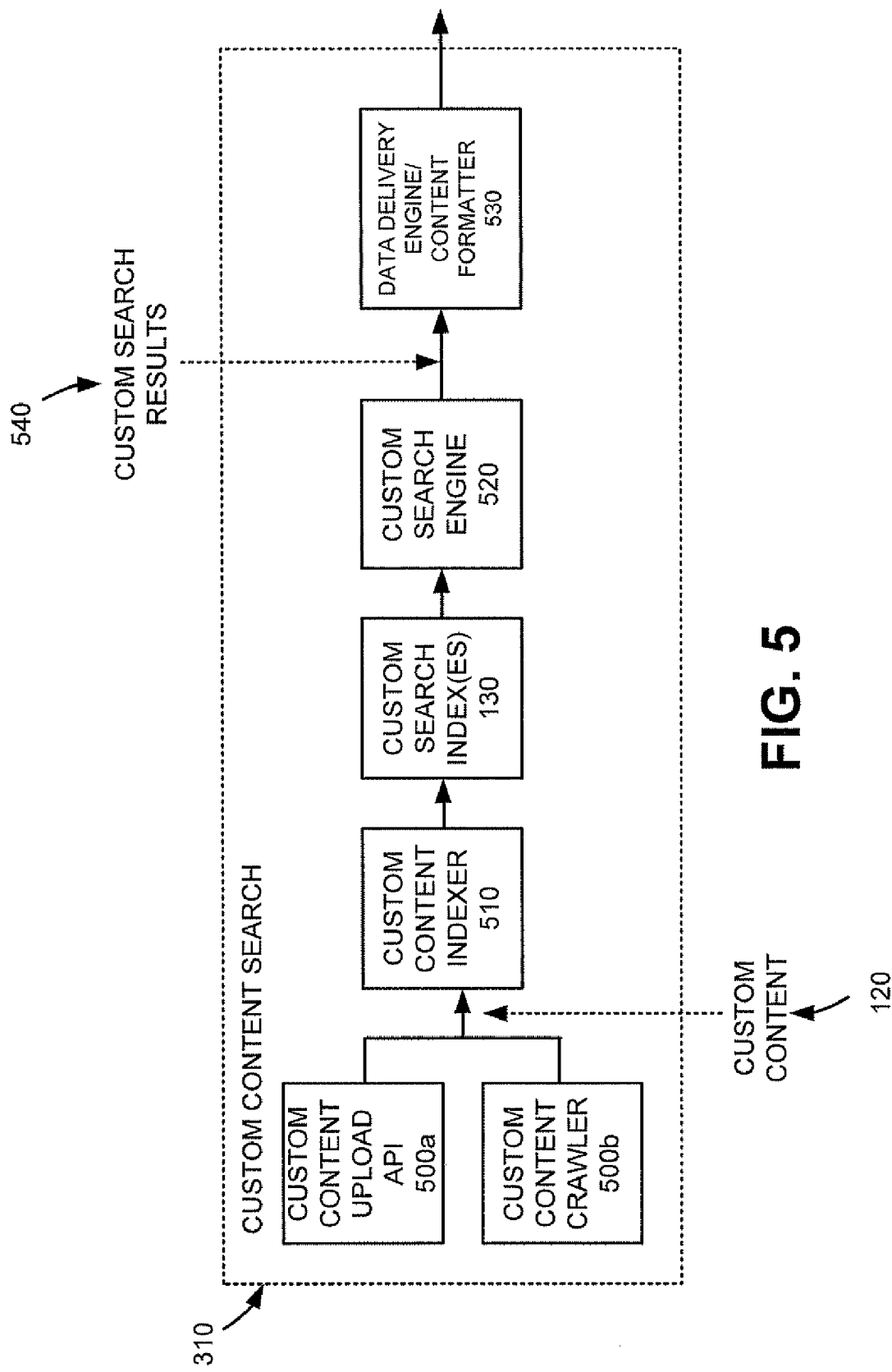
FIG. 5 is an exemplary diagram of the custom content search unit of FIG. 3.

FIG. 5 is an exemplary diagram of custom content search unit 310. As shown in FIG. 5, custom content search unit 310 may include a custom content upload Application Programmer Interface (API) 500a, a custom content crawler 500b, a custom content indexer 510, one or more custom search indexes 130, a custom search engine 520 and a data delivery engine/content formatter 530.

Custom content upload API 500a may receive custom content 120 uploaded from one or more users (e.g., one or more authenticated users). The uploaded content may include data in any type of format. In one implementation, the uploaded content may include meta-data (e.g., Extensible Markup Language (XML) data). The meta-data may include content metadata with pointers to actual content. In another implementation, custom content upload API 500a may include a translation engine for translating any type or format of uploaded data into a particular type or format of data that can be more easily processed by custom content indexer 510. Custom content upload API 500a may pass the received custom content 120 to custom content indexer 510.

Custom content crawler 500b may crawl specific content on the web or within one or more databases to retrieve documents that may be indexed in a corresponding custom search index 130. Custom content crawler 500b may crawl any type of document or database, including, for example, flatfiles, binary files, etc. For example, custom content crawler 500b may crawl available documents on the web containing content directed to a specific topic (e.g., dogs, football, etc.) or documents identified by a custom content provider (e.g., the "owner" of a corpus of custom content). As an additional example, custom content crawler 500b may crawl documents similar to documents identified by the user as being part of the user's custom content. The user may, thus, designate content that may be grouped together and searched via the user's custom search index. Custom content crawler 500b may, in some implementations, need to be authenticated by content providers associated with specific custom content crawled on the web or within one or more databases. Custom content crawler 500b may pass the crawled custom content 120 to custom content indexer 510.

Custom content indexer 510 may index custom content 120 to create custom search index(es) 130. For example, custom content indexer 510 may take the text or other data of custom content 120, extract individual terms from the text or other data of custom content 120, and sort those terms or other data (e.g., alphabetically) into a single custom search index 130. Other techniques for extracting and indexing content, that are more complex than simple word-level indexing, may also be used, including techniques for indexing XML data, images, videos, etc. Each entry in a custom search index 130 may contain a term or other data stored in association with an item of content in which the term or other data appears and a location within the custom content where the term or other data appears.

Custom search engine 520 may search custom search index(es) 130, based on a received search query, to match terms of the search query with terms or other data contained in entries in custom search index(es) 130. If custom search index(es) 130 includes multiple different custom search indexes, then custom search engine 520 may search, based on the received search query and, possibly, user authentication, selected ones of the different custom search indexes. Custom search engine 520 may retrieve a corresponding list of items of custom content from each entry in custom search index 130 that matches a term of the search query. The lists of items of content retrieved from one or more entries in custom search index 130 may be returned as custom search results 540. In one implementation, each result of custom search results 540 may include a URL associated with a corresponding search result document and, possibly, a snippet of content extracted from the corresponding search result document. Data delivery engine/content formatter 530 may receive the search results from custom search engine 520, format the search results into a meaningful data format (e.g., into a HTML document) that can be received and displayed by the user (e.g., via a web browser). Data deliver engine/content formatter 530 may customize the formatting of the search results (e.g., the content and visual format of the data) received from custom search engine 520 based on individual user preferences or based on the preferences of the custom content provider whose custom content is being searched.

Exemplary Security Unit

Figure 6:
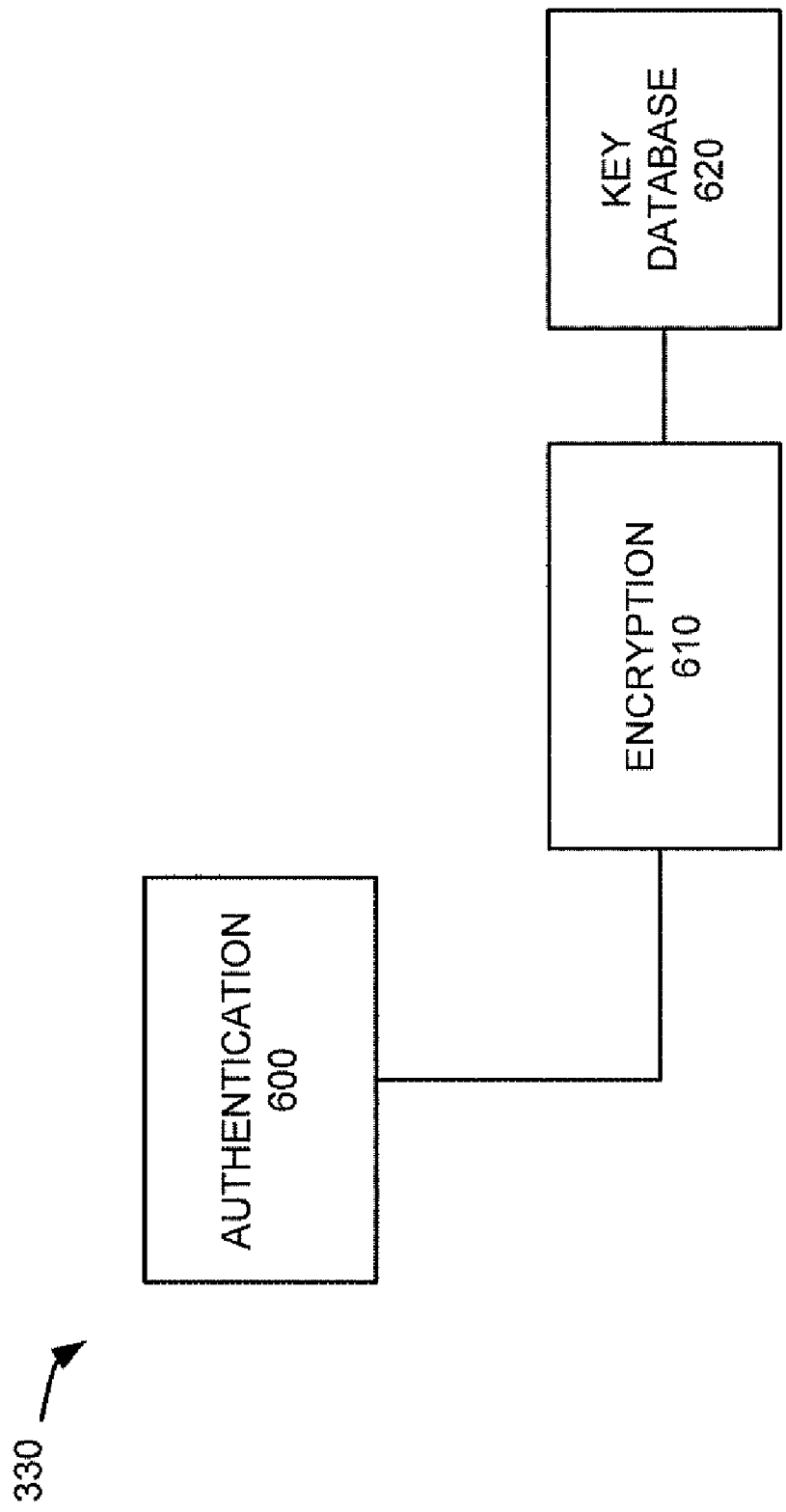
FIG. 6 is an exemplary diagram of the security unit of FIG. 3.

FIG. 6 illustrates a security unit 330 according to an exemplary implementation. Security unit 330 may include an authentication unit 600, an encryption unit 610 and a key database 620. Authentication unit 600 and encryption unit 610 may be implemented as one or more separate server entities, as software or hardware components within a single server entity, or as software or hardware components distributed across multiple server entities.

Authentication unit 600 may include functionality for authenticating users that upload custom content to custom content search system 310, and/or functionality for authenticating users that wish to access and search custom content indexed by custom content search system 310. Authentication unit 600 may, for example, authenticate a user and pass one or more authentication tokens (e.g., one authentication token for accessing custom content associated with one or more custom search indexes) for each custom search index or group of custom search indexes to a particular user, where the one or more authentication tokens may include security keys intended to allow for channel encryption (e.g., for sensitive or confidential custom content that needs secure transmission). Encryption unit 610 may include functionality for distributing encryption keys obtained from key database 620 to clients 205, and for encrypting and decrypting data sent to, or received from, clients 205. Key database 620 may store encryption key material that may be retrieved for distribution to clients 205 for encrypting and decrypting data sent to, or received from, clients 205.

Exemplary Accounting Unit

Figure 7:
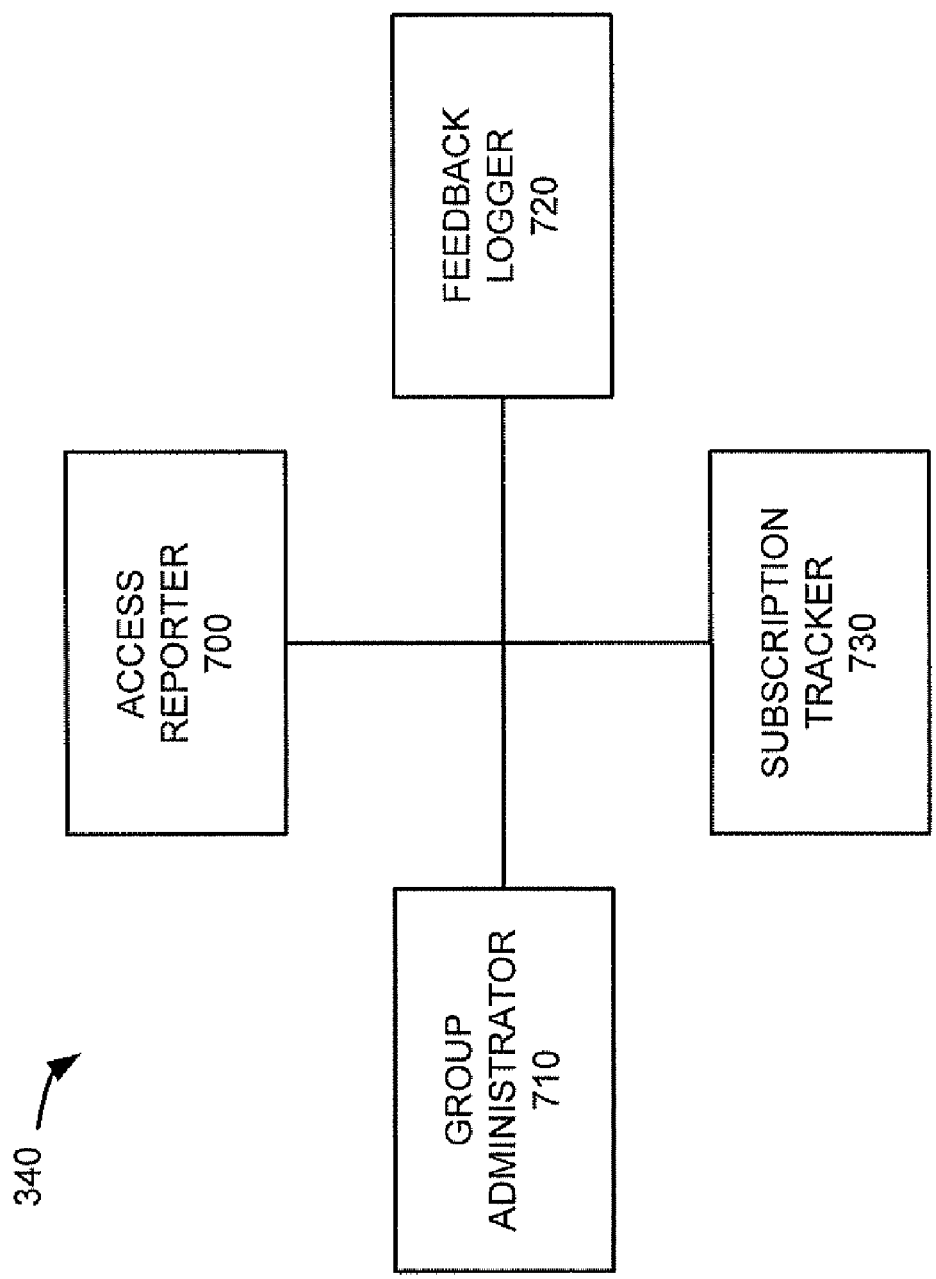
FIG. 7 is an exemplary diagram of the accounting unit of FIG. 3.

FIG. 7 illustrates an exemplary accounting unit 340 according to an exemplary implementation. Accounting unit 340 may include an access reporter 700, a group administrator 710, a feedback logger 720 and a subscription tracker 730.

Access reporter 700 may track, log and report access to given custom search indexes 130. A service provider that provides custom content to custom content searching system 210 may require real-time information about the access patterns of the service provider's custom content. Access reporter 700 may implement a feedback mechanism by which, for example, a user identifier and a document identifier may be sent to the service provider when custom content is retrieved by a user. This permits the service provider to track access to its custom content, and possibly charge the user for access to its custom content.

Group administrator 710 may include functionality that is accessible only to users given administrative privileges. Users with administrative privileges may use group administrator 710 to upload specific custom content to content searching system 210, or to modify user access rights. Users with administrative privileges (i.e., "owners" of corpora of custom content) may directly manage their custom content services via network 230 (e.g., modify their custom content, modify which user's may access their custom content, etc.).

Feedback logger 720 may track and log documents, links or the content of custom content 120 accessed by users. Feedback logger 720 may also obtain feedback from users about the quality and/or relevance of specific content of custom content 120 accessed by the users. The log of documents, links or content of custom content 120, or the user feedback, may then be used by custom search engine 520 in scoring custom content 120 for the purpose of ranking or filtering custom search results 540 prior to providing the results to data delivery engine/content formatter 530.

Subscription tracker 730 may track and log user access to content contained in indexed custom content (e.g., subscription content). Subscription tracker 730 may permit or deny access to specific custom content based on a given user's subscription to the specific content. Subscription tracker 730 may also include a crediting system in which certain user actions remove credits from the user's account. When the user's credits fall to zero, the user would be denied any further access to custom content 120. Subscription tracker 730 may also include data movement tracking functionality that permits users that have established a custom search index (e.g., a corpora of custom content) to track and view usage of their custom content (e.g., for billing purposes, tracking the movement of intellection property, etc.).

Exemplary Index Database

Figure 8:
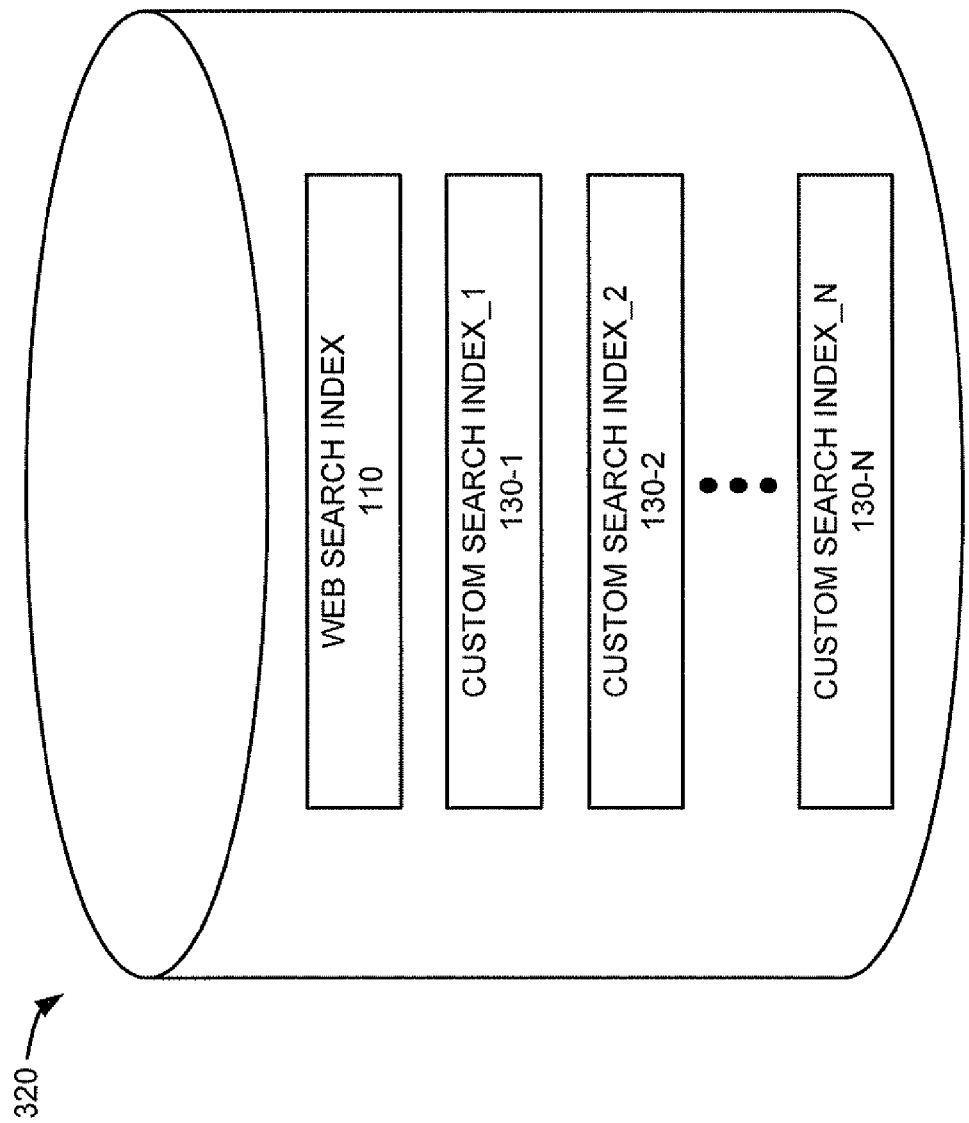
FIG. 8 is an exemplary diagram of the index database of FIG. 3.

FIG. 8 is an exemplary diagram of index database 320. As shown in FIG. 6, index database 320 may include a web search index 110 and one or more custom search indexes 130-1 through 130-N 9 (where N≧1). Each of custom search indexes 130-1 through 130-N may include data structures that are separate and distinct from one another, and from web search index 110. Web search index 110 may include multiple entries, with each entry containing a term or other data stored in association with a list of documents in which the term or other data appears and the location within the document text where the term or other data appears. Web search engine 420 may search web search index 110 based on a received search query to match terms of the search query with terms or other data contained in entries of web search index 110.

Each one of custom search indexes 130-1 through 130-N may include multiple index entries, with each entry containing a term or other data stored in association with an item of custom content in which the term or other data appears and a location within the custom content where the term or other data appears. Custom search engine 520 may search custom search index(es) 130, based on a received search query, to match terms of the search query with terms or other data contained in entries in custom search index(es) 130.

Exemplary Content Indexing Process

Figure 9:
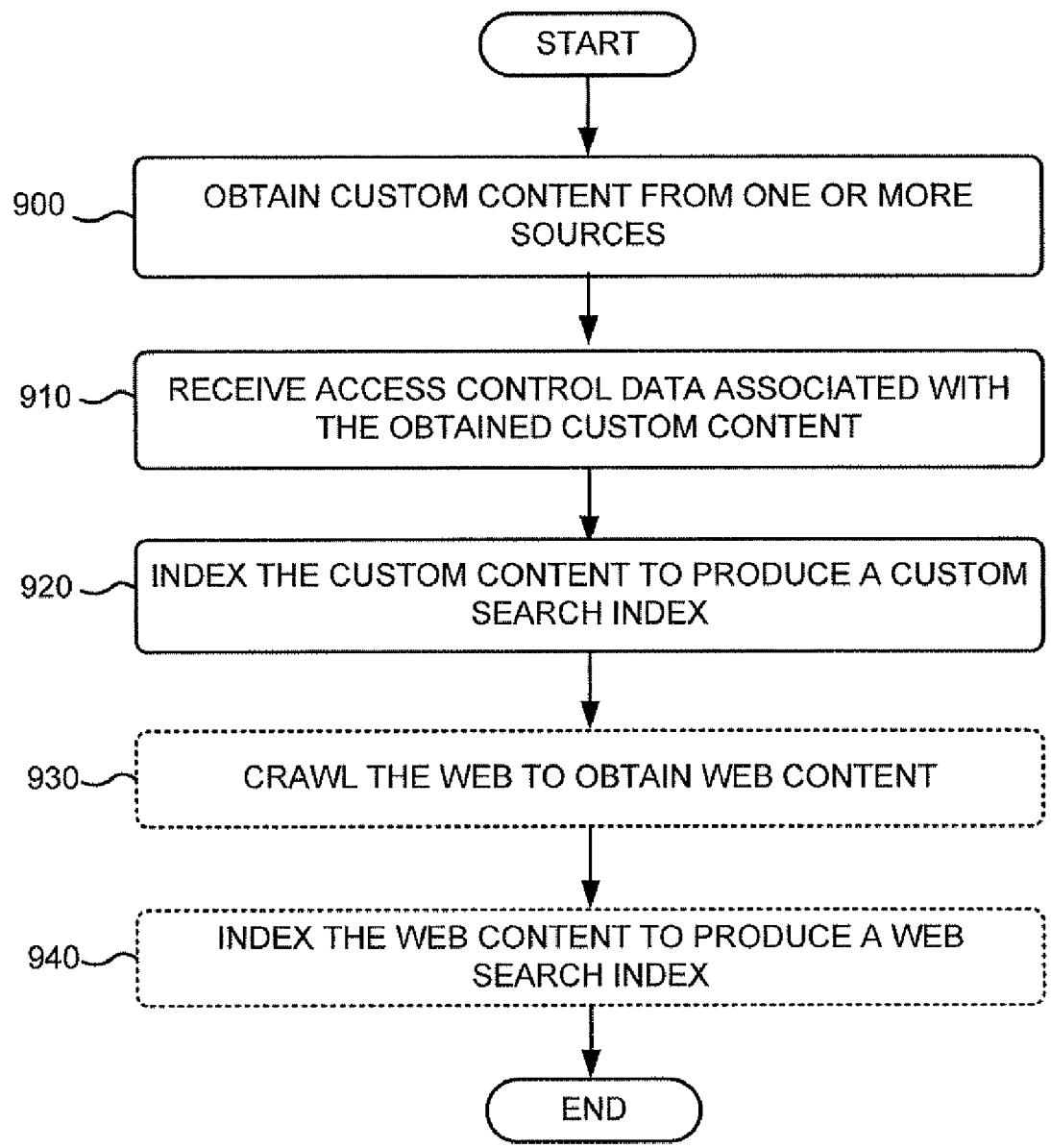
FIG. 9 is a flowchart of an exemplary process for indexing web content and custom content.

FIG. 9 is a flowchart of an exemplary process for indexing custom content and, possibly, web content. The process exemplified by FIG. 9 may be performed by content searching system 210.

The exemplary process may begin with obtaining custom content from one or more sources (block 900). For example, custom content upload API 500 may upload custom content from one or more users at clients 205. As another example, custom content upload API 500 may upload subscription content from one or more subscription content service providers. As an additional example, subscription content from one or more subscription content service providers, or content from documents obtained from multiple sources that is related to a same topic, may be obtained from custom content crawler 500*b* of custom content search unit 310 for indexing in respective custom indexes. As an additional example, custom content crawler 500*b* may crawl documents (e.g., web documents) designated by the user (e.g., the "owner" of a corpus of custom content) as being part of the user's custom content. The user may, thus, designate content (e.g., web documents) that may be grouped together and searched via the user's custom search index.

Custom content crawler 500*b* may also crawl and retrieve content from web documents, that may be ranked relatively low by web search engine 420, for inclusion in a respective custom search index. Custom content crawler 500*b*, therefore, may crawl content already crawled by web crawler 400 that may be ranked higher with respect to a given corpus of custom content as compared to ranking of the content by web search engine 420. For example, documents about a certain topic may be ranked highly with respect to content associated with a custom search index that is related to that topic. An "owner" of a corpus of custom content may, thus, group together content that the "owner" desires to be included in the corpus of custom content (e.g., uploaded custom content grouped together with other user designated content, such as, for example, user designated web documents).

Many different types of custom content may be uploaded and indexed consistent with exemplary embodiments. For example, a given custom search index may aggregate and index multiple subscription-based web sites. If a user subscribes to a group of subscription-based web sites, then the user can search content from all of the subscription-based web sites simultaneously using a single custom search index. As another example, a company may upload all of their company events, policies, etc. to a custom search index such that only company employees may search the custom search index. As an additional example, a company, such as, for example, Netflix, may upload custom content to their own custom search index. Netflix can increase traffic to their own web site by building a custom search index of their movie titles. Users may then join a Netflix custom index group and automatically receive movie title search results when they perform a regular web search (e.g., a Google search on google.com). Moreover, Netflix could tag new movie releases so that Netflix users can just type the search query "new releases" in, for example, the Google search interface and receive newly released movie titles as part of the returned search results. As yet another example, a software company, such as, for example, Oracle, could upload their knowledge base to their own custom search index and then make this knowledge base available only to licensed users. The knowledge base could include frequently asked questions (FAQs), documentation, troubleshooting tips, customer support information, bugs, etc. As a further example, local libraries, Amazon.com or Barnes & Nobles could create their own custom indexes. Then, when a user who enjoys reading books searches a topic (e.g., using Google search) and when there are books that match that search, the books may be returned as results in the search results so that the user may check for pricing and/or availability. As yet another example, a user could create a custom search index relating to a particular topic by identifying documents (e.g., web documents) relating to that topic. As another example, a user can create a custom search index containing his bookmarks (e.g., favorite web pages or sites) that can be shared with, and/or searched, by other users.

Access control data associated with the obtained custom content may be received (optional block 910). Each custom search index 130-1 through 130-N may, or may not, have access control data associated with it. Thus, some of custom search indexes 130-1 through 130-N may be restricted to authenticated users (e.g., subscribing users) while others may not (e.g., available to non-subscribing users). The received access control data may also be associated with other custom content. Therefore, a given user may subscribe to, or have an account that is associated with, N different custom search indexes, thus, permitting the given user to search those indexes automatically for each of the user's searches. The access control data may include data used for authenticating users who may supply additional custom content to a given custom search index or for authenticating users who may access and search custom content associated with a given custom search index. For example, the access control data may include a log-in identifier and a password for a respective user. Authentication unit 600 may store the received access control data for use in subsequent user authentication.

The custom content may be indexed to produce a custom search index (block 920). For example, custom content indexer 510 may take the text of custom content 120 received from an authenticated user (e.g., the custom content provider), extract individual terms or other data from custom content 120, and sort those terms (e.g., alphabetically) into a custom search index 130. Each entry in a custom search index 130 may contain a term or other data stored in association with an item of content in which the term or other data appears and a location within the custom content where the term or other data appears. Custom search index 130 may be stored in index database 320.

The web may be crawled to obtain web content (optional block 930). For example, web crawler 400 may find and retrieve web content 430 (e.g., from web documents) and hand the retrieved web content 430 off to web content indexer 410. Web crawler 400 may send a request to a web server for a web page, download the entire web page, and then hand the web page off to web content indexer 410.

The obtained web content may then be indexed to produce a web search index 110 (optional block 940). Web content indexer 410 may index received web content 430 to create web search index 110. For example, web content indexer 410 may take the full text or other data of a given crawled document, extract individual terms or other data from the document and sort those terms or other (e.g., alphabetically) into web search index 110. Each entry in web search index 110 may contain a term or other data stored in association with a list of documents in which the term or other data appears and the location within the document's text where the term or other data appears. Web search index 110 may be stored in index database 320.

Exemplary Content Searching Process

Figure 10:
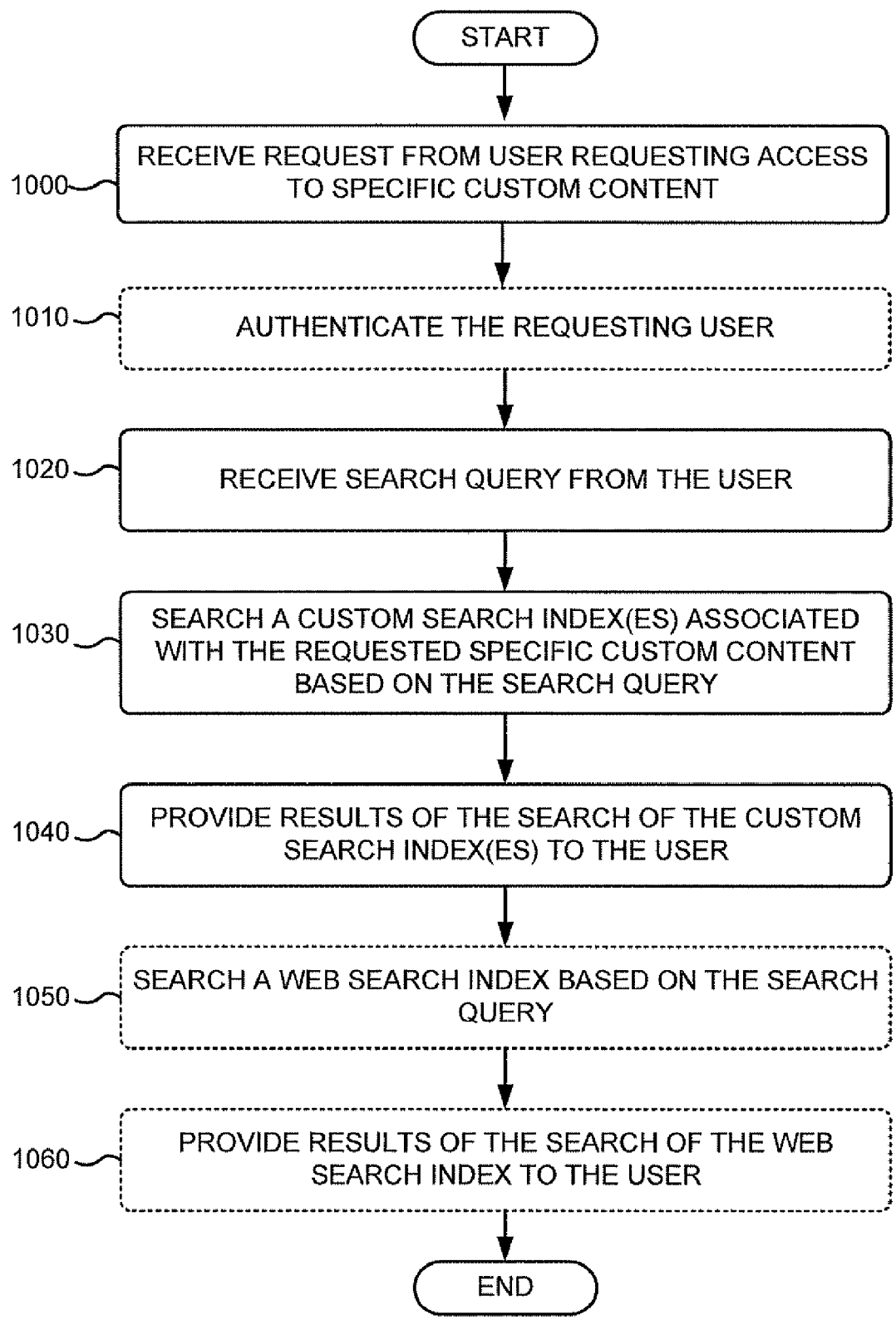
FIG. 10 is a flowchart of an exemplary process for searching a custom search index.

FIG. 10 is a flowchart of an exemplary process for searching one or more custom search indexes produced, for example, using the exemplary process of FIG. 9. The process exemplified by FIG. 10 may be performed by content searching system 210.

Figure 11:
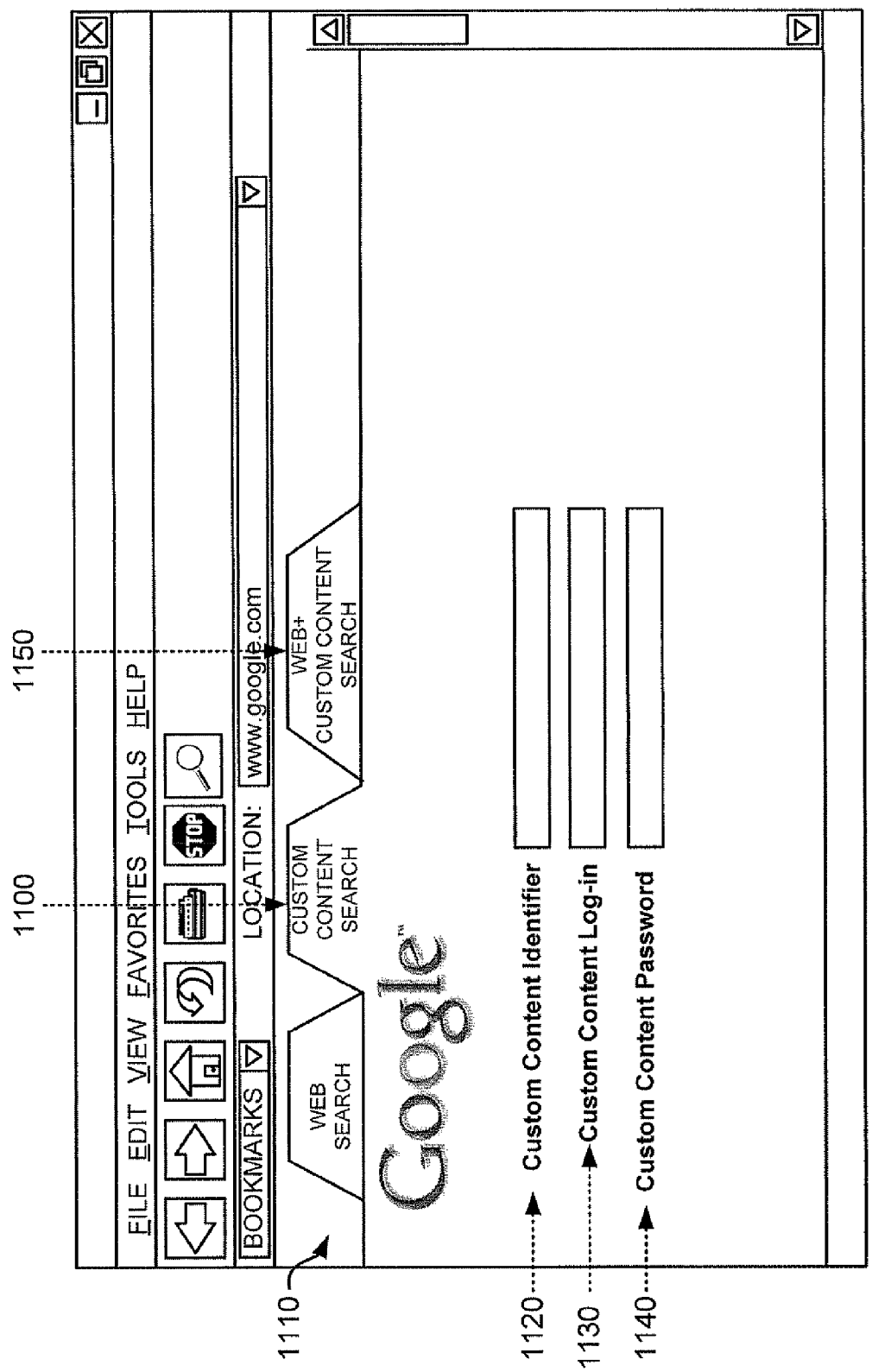
FIG. 11 is an exemplary diagram of a document that a user may use to authenticate himself before searching custom content.

The exemplary process may begin with the receipt of a request from a user requesting access to specific custom content (block 1000). For example, the access request may include a log-in identifier and password supplied by the user. As shown in FIG. 11, a user at a client 205 may select a "custom content search" tab 1100 contained in a search document 1110 displayed by the user's browser. Fields, such as, for example, a custom content identifier field 1120, a custom content log-in field 1130 and a custom content password field 1140 may then be displayed in search document 1110. The user may enter appropriate data into fields 1120, 1130 and 1140 to authenticate himself as having a right to access the desired custom content. As further shown in FIG. 11, the user at client 205 may select a "web+custom content search" tab 1150. The user may enter appropriate data into fields 1120, 1130 and 1140 to search a specific custom search index and the web search index. Any custom content identifier data entered into custom content identifier field 1120 may be associated with one or more custom search indexes. For example, a single given custom content identifier may be associated with, and allow access to, several different custom search indexes. In another implementation, a given custom content log-in and custom content password may be implicitly associated with one or more custom search indexes. In this implementation, the user does not have to explicitly identify the custom content that he desires to access, since the user's log-in and password has already been associated with one or more custom search indexes. In other implementations, the user may enter multiple different custom content identifiers to select multiple custom search indexes to search. In some implementations in which the custom content does not require authentication (e.g., is available to non-subscribers), mere selection of specific custom content, without user authentication, may only be required for access to the specific custom content.

The requesting user may then be authenticated (optional block 1010). Authentication unit 600 may authenticate the user using previously received access control data. For example, authentication unit 600 may authenticate the user using the log-in identifier and password supplied by the user. If authentication unit 600 authenticates the user, then the exemplary process may continue with block 1020. If authentication unit 600 does not authenticate the user, then the user will be denied access to the requested custom content. Authentication of the user may occur at the time at which the user requests access to specific custom content, or the authentication may have occurred earlier. For example, a user may log-in at the time the user first accesses search document 1110 prior to the user requesting access to specific custom content. For some of the specific custom content associated with a respective custom search index(es), user authentication may not be required and, thus, block 1010 may be skipped.

Figure 12:
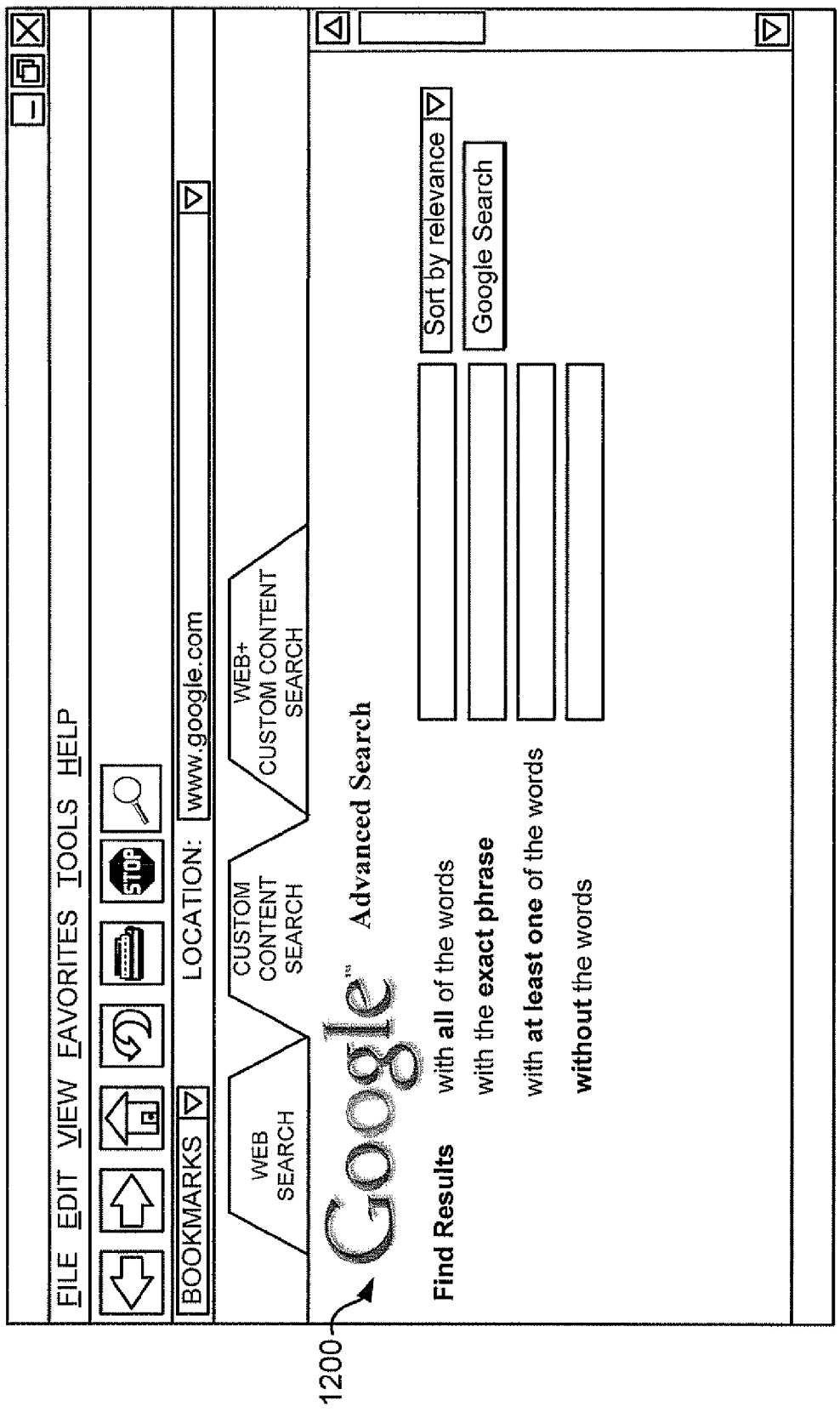
FIG. 12 is an exemplary diagram of a search document that a user may use to enter search terms of a search query.

A search query may be received from the user (block 1020). Custom search engine 520 may receive a search query from a user at a client 205 via network 230. For example, as shown in FIG. 12, a user may enter search terms of a search query into a search document 1200 displayed by the user's browser. One or more custom search indexes associated with the specific custom content that the user requested access to (e.g., corresponding to the custom content identifier(s) supplied by the user) may be searched based on the received search query (block 1030). Custom search engine 520 may search one or more custom search indexes 130-1 through 130-N associated with the specific custom content to which the user requested access to obtain custom search results 540.

Results of the search of the custom search index(es) may be provided to the user (block 1040). Data delivery engine/content formatter 530 may format custom search results 540 received from custom search engine 520 and provide the formatted custom search results 540 to a client 205 associated with the authenticated user via network 230.

Figure 13:
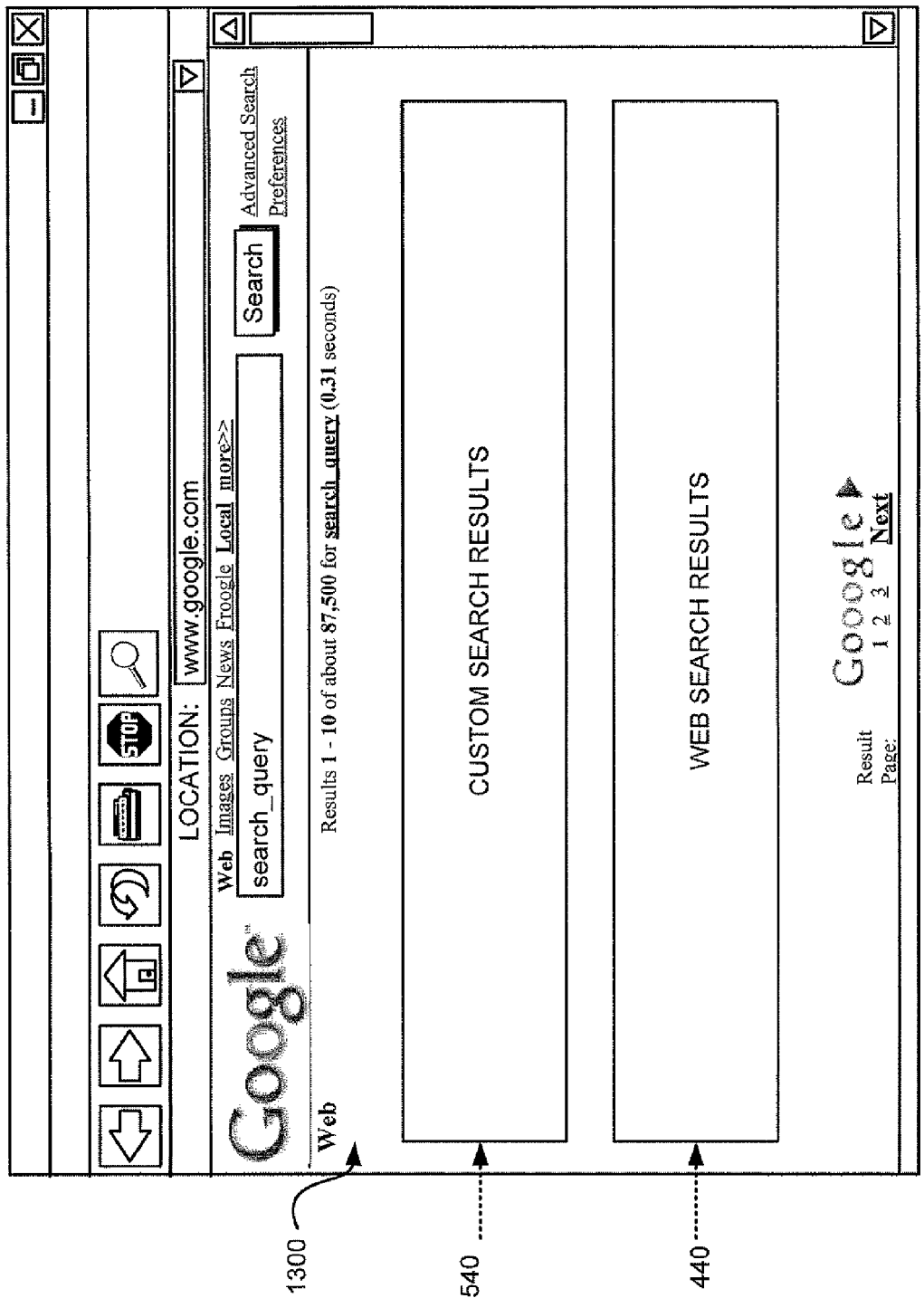
FIG. 13 is an exemplary diagram of a search result document that may provide custom search results and web search results to a user.

Web search index 110 may also be searched based on the search query (optional block 1050). Web search engine 420 may search web search index 110, based on the search query, to return web search results 440. The results of the search of web search index 110 may be provided to the user (optional block 1060). Result formatter 350 may combine the formatted custom search results 540 received from data delivery engine/content formatter 530 together with web search results 440 and provide the combined results to a client 205 associated with the authenticated user via network 230. For example, as shown in FIG. 13, custom search results 540 may be provided to the authenticated user via a search result document 1300 along with web search results 440. As depicted in FIG. 13, custom search results 540 may be displayed prominently (e.g., at the top of the search results), or highlighted, with respect to web search results 440.

CONCLUSION

Implementations described herein provide illustration and description, but is not intended to be exhaustive or to limit the invention to the precise form disclosed. Modifications and variations are possible in light of the above teachings, or may be acquired from practice of the invention. For example, while series of acts have been described with regard to FIGS. 9 and 10, the order of the acts may be modified in other implementations consistent with the principles of the invention. Further, non-dependent acts may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of the aspects have been described without reference to the specific software code, it being understood that software and control hardware could be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method performed by a searching system, the method comprising:

crawling, by one or more devices within the searching system, the web to obtain web content by:

indexing, by one or more devices within the searching system, the web content to produce a web search index;

receiving, by one or more devices within the searching system, first custom content associated with a first user, where the first custom content includes data that is uploaded by the first user via an application programming interface or includes data that is designated by the first user from a set of documents;

indexing, by one or more devices within the searching system, the first custom content to produce a first custom search index, where the first custom search index is different than the web search index;

receiving, by one or more devices within the searching system and from a second user, a search query submitted via a user interface;

searching by one or more devices within the searching system and based on the search query, the web search index and the first custom search index, where searching the web search index and the first custom search index includes:

permitting, by one or more devices within the searching system, the second user to have unrestricted access to the web search index, and permitting, by one or more devices within the searching system, the second user to have restricted access to the first custom search index; and displaying to the second user, by one or more devices within the searching system, results from searching the web search index and the first custom search index.

2. The computer-implemented method of claim 1, further comprising:

receiving second custom content associated with a second user;

indexing the second custom content to produce a second custom search index, where the second custom search index is different than the first custom search index and the web search index; and searching, based on the search query, the second custom search index, where the searching includes permitting restricted access to the second custom search index.

3. The computer-implemented method of claim 1, further comprising:

authenticating the second user, where permitting the second user to have restricted access to the first custom search index includes searching, after the second user is authenticated, the first custom search index based on the search query.

4. The computer-implemented method of claim 1, where the web content includes text associated with each document of a plurality of documents crawled on the web.

5. The computer-implemented method of claim 1, where the web search index contains a first plurality of index entries, and where at least one of the first plurality of index entries stores:

a term or other data extracted from the web content, and a list of identifiers that identifies where the term or other data appears in the web content.

6. The computer-implemented method of claim 5, where the first custom search index contains a second plurality of index entries, and where at least one of the second plurality of index entries stores:

a term or other data extracted from the first custom content, and a list of identifiers that identifies where the term or other data appears in the first custom content.

7. A system, comprising:

one or more devices comprising:

means for crawling the web to obtain web content;

means for indexing the web content to produce a web search index;

means for receiving first custom content from a user via an application programming interface (API);

means for indexing the first custom content to produce a first custom search index, where the first custom search index is different than the web search index;

means for authenticating a second user;

means for receiving a search query submitted from the second user via a user interface;

means for searching the web search index based on the search query, means for selectively searching, based on the search query and based on a result of authenticating the second user, the first custom search index; and means for forwarding, to the user interface, results from searching the web search index and results from selectively searching the first custom search index.

8. The system of claim 7, where the web content does not include any documents included in the first custom content.

9. The system of claim 7, further comprising:

a database to:

store the web search index and the first custom search index, the web search index being separate and distinct from the first custom search index in the database.

* * * * *